F. CUTTING AND B. WASHINGTON.
PRODUCTION OF HIGH FREQUENCY OSCILLATIONS.
APPLICATION FILED JUNE 26, 1918.

1,366,311.  Patented Jan. 18, 1921.

UNITED STATES PATENT OFFICE.

FULTON CUTTING, OF TUXEDO PARK, NEW YORK, AND BOWDEN WASHINGTON, OF CAMBRIDGE, MASSACHUSETTS.

PRODUCTION OF HIGH-FREQUENCY OSCILLATIONS.

1,366,311.      Specification of Letters Patent.     Patented Jan. 18, 1921.

Application filed June 26, 1918. Serial No. 242,071.

*To all whom it may concern:*

Be it known that we, FULTON CUTTING and BOWDEN WASHINGTON, both citizens of the United States, and residents, respectively, of Tuxedo Park, Orange county, New York, and Cambridge, Middlesex county, Massachusetts, have invented a new and useful Improvement in the Production of High-Frequency Oscillations, of which the following is a full, clear, and exact description, reference being had to the accompanying drawings, forming part of this specification, in which:—

Figure 1:
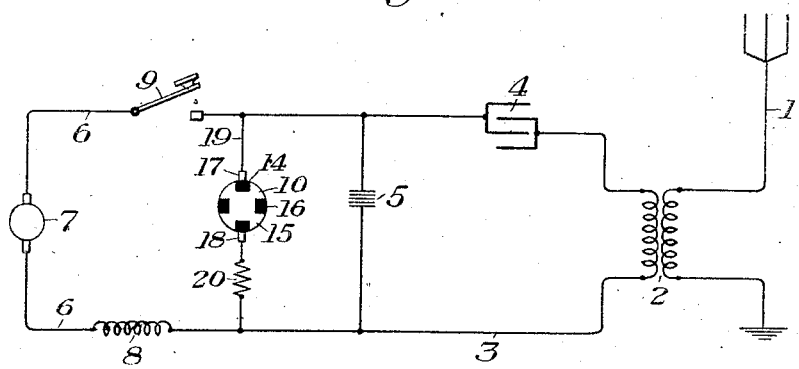
Figure 2:
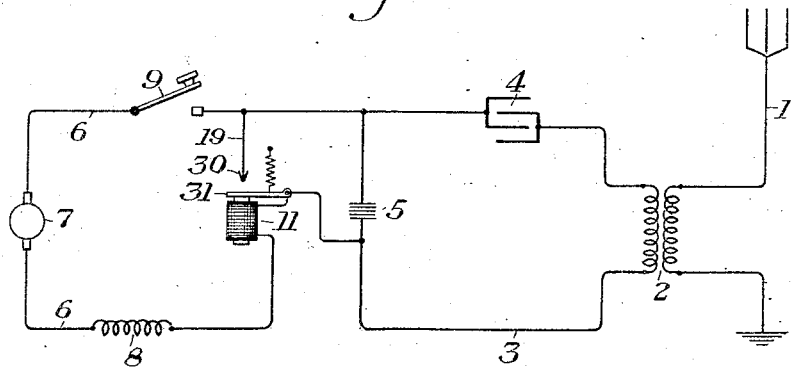

Figure 1 is a diagrammatic view of the circuit connections showing a rotary make and break device, and Fig. 2 is a similar view showing a buzzer type of make and break device.

The present invention relates to the production of high frequency oscillations, particularly for use in wireless telegraphy. The object of the invention is to produce a simple form of apparatus for periodically exciting a discharge gap and condenser circuit, so as to produce groups of high frequency oscillations.

Referring to the drawings, which illustrate the preferred embodiment of the invention, the high frequency oscillations are set up in the oscillation or radiating circuit 1 provided with usual antenna and ground. The oscillation circuit 1 is coupled by the usual transformer 2 to a discharge circuit 3. The discharge circuit 3 contains a condenser 4 and a discharge gap 5, preferably a cooled quenched gap. The condenser 4 is fed by a feed circuit 6, which contains a source of electromotive force, such as a direct circuit generator 7, and an inductance 8. This circuit is furnished with the usual sending key 9. A circuit 19, containing a make and break device, is connected in shunt with the discharge gap 5. In the embodiment of the invention illustrated in Fig. 1, the make and break device is a rotary make and break 10, while in the embodiment illustrated in Fig. 2, it is a make and break device 11 of the buzzer type. When the make and break device is closed, the shunt circuit 19 forms a short circuit diverting the current from the condenser 4 and discharge gap 5 and permitting an increased current to flow from the generator 7 through the inductance 8. The increased current stores magnetic energy in the inductance 8. When the make and break device breaks the short circuit through the shut 19, the current from the generator flows into the condenser 4, which discharges through gap 5, with the result that high frequency oscillations are induced in the oscillation circuit 1. When the short circuit through the shut circuit 19 is broken, the energy stored in the inductance 8 is applied as an added electromotive force for charging the condenser 4. As the make and break device operates to alternately short circuit the gap 5 and condenser 4 and then break such short circuit, the inductance 8 alternately receives and gives up energy. This tends to equalize the load on the generator. It also permits the system to be worked over a considerable range of electromotive force impressed by the generator 7, because when the make and break device opens the shunt circuit 19, the inductive kick from the inductance 8 causes an electromotive force to be applied to the condenser 4, which may be higher than the electromotive force of the generator 7.

The condenser, the discharge gap 5 and feed current are preferably so related that for each break of the make and break device, a number of condenser discharges pass across the discharge gap 5. In the system illustrated in the drawings, the oscillations are produced in the antenna circuit 1 by impact excitation. The gap 5 is so constructed and the circuits so connected that the condenser discharges across the gap are substantially unidirectional, as shown for example in the patent of Emory L. Chaffee, No. 1,189,791.

Referring to the make and break device illustrated in Fig. 1 of the drawings. This is simply a wheel 14 with alternating conducting segments 15 and insulating segments 16 which are engaged by contacting brushes 17 and 18. The wheel 14 is driven at the proper speed to continuously make and break the circuit 19, which shunts the spark gap 5. For proper operation, the peripheral speed of the wheel 14 should be great enough so that with the particular value of the feed current employed, the condenser will not charge up fast enough to reach the voltage which causes sparking at the break. As long as the voltage of the condenser increases more slowly than the voltage which would cause sparking at the segments of the make and break device, the operation is satisfactory. Sometimes a small jump-forward spark will occur at the make, but any injurious effects of such sparking can be cut down by the use of the small resistance 20 in series with the make and break device.

Referring to the embodiment illustrated in Fig. 2:—The make and break device 11 is of the buzzer type. In using the buzzer type the operation is slightly different from that with the rotary make and break. With the buzzer type it is difficult to have the contacts separated with sufficient velocity to prevent sparking at the break. If, however, the contacts 30 and 31 of the buzzer are properly designed and are of suitable material, the spark occurring at the break will be a useful spark, that is, the condenser instead of discharging through the gap 5 will at first discharge through the buzzer gap 30—31 and high frequency oscillations will be induced thereby in the oscillation circuit. In practice it is found that the buzzer type of make and break operates as follows:—When the contacts 30 and 31 separate, initial sparking occurs at the buzzer gap. When this gap becomes wider than the main gap 5, the sparking is shifted from the buzzer gap to the main gap. This shift has certain advantages. It relieves the buzzer gap of the load which would tend to overload it. This is particularly important as it is difficult to make buzzers of proper frequency and yet large enough to take care of any considerable degree of power. The shift of the spark from the buzzer gap to the main gap is also advantageous as the final sparking occurs through a gap whose maximum length is fixed. If the sparking should occur entirely through the buzzer gap without being shifted to the main gap, the gap length would then vary from zero to an undesirable maximum when the buzzer contacts 30 and 31 are fully separated. It is found in practice that the quenching properties of the gap decrease as its length increases, so that it is desirable that the sparking be shifted to a gap of predetermined length rather than a gap whose length is variable and increases to an undesirable amount.

By the present system, groups of condenser discharges with consequent groups of high frequency oscillations, are obtained with exceedingly simple devices such as rotary or buzzer make and breaks. The speed of the make and break device can be adjusted to give the desired group frequency to the trains of radiating oscillations. Not only does the make and break device furnish a simple means of producing properly timed groups of high frequency oscillations, but it permits the advantageous use of the energy stored in inductance 8 in connection with the source of electromotive force, permitting the apparatus to be worked at a considerable range of impressed electromotive force, as the inductance 8 stores energy and tends to raise the voltage applied to the condenser when the make and break device breaks the shunt circuit.

The present invention is not limited to its preferred embodiment but may be otherwise embodied within the scope of the following claims.

We claim:

1. Apparatus for producing high frequency oscillations of audible group frequency, comprising a condenser, a feed circuit for charging the condenser, and a discharge gap for the condenser, and a make and break device continuously operating at an audible frequency when the oscillations are being produced to periodically short circuit the discharge gap and thereby cause the high frequency oscillations to have a group frequency corresponding to that of the make and break device, substantially as described.

2. Apparatus for producing high frequency oscillations of audible group frequency, comprising a condenser, a feed circuit for charging the condenser containing an inductance, a discharge gap for the condenser, and a make and break device connected with the feed circuit, said make and break device continuously operated at an audible frequency when the oscillations are being produced and operating to increase the current in the feed circuit when the make and break device is closed and thereby store energy in the inductance and to permit the energy stored in the inductance to be applied for charging the condenser when the make and break device is opened, substantially as described.

3. Apparatus for producing groups of high frequency oscillations, comprising a condenser, a feed circuit containing inductance for charging the condenser, a discharge gap for the condenser and a make and break device continuously operating at a predetermined frequency when the oscillations are being produced and so connected as to increase the current in the feed circuit when the make and break device is closed and thereby store energy in the feed circuit inductance and to permit the energy thus stored to be applied for charging the condenser when the make and break device is opened, substantially as described.

4. Apparatus for producing high frequency oscillations of a predetermined group frequency, comprising a condenser, a feed circuit for charging the condenser, a discharge gap for the condenser, and a make and break device continuously operating at a predetermined frequency when the oscillations are being produced to periodically short circuit the discharge gap and thereby cause the high frequency oscillations to have a group frequency corresponding to that of the make and break device, the contacts of the make and break device separating at such speed that the initial condenser discharge takes place across the make and break gap and thereafter shifts to the discharge gap, substantially as described.

5. Apparatus for producing groups of high frequency oscillations, comprising a condenser, a feed circuit for charging the condenser, and discharge gap means for the condenser including a buzzer make and break and a gap of fixed length in multiple and so proportioned that the discharge will shift from the buzzer gap to the fixed length gap as the buzzer gap opens, substantially as described.

6. The combination with a condenser, of a discharging means therefor including a buzzer make and break and a gap of fixed length in multiple and so proportioned that the discharge will shift from the buzzer gap to the fixed length gap as the buzzer gap opens, substantially as described.

In testimony whereof, we have hereunto set our hands.

FULTON CUTTING.
BOWDEN WASHINGTON.